(12) United States Patent
Fried et al.

(10) Patent No.: US 7,921,170 B2
(45) Date of Patent: Apr. 5, 2011

(54) METHOD FOR VIRTUAL ELECTRONIC MAIL ADDRESS GENERATION AND USAGE

(75) Inventors: Eric Philip Fried, Austin, TX (US);
Rajeev Mirsha, Austin, TX (US);
Suresh Sabarathinam, Chanaraipet (IN)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 12/209,231

(22) Filed: Sep. 12, 2008

(65) Prior Publication Data

US 2010/0070583 A1    Mar. 18, 2010

(51) Int. Cl.
*G06F 15/16* (2006.01)
*G06F 15/173* (2006.01)
*G06F 15/177* (2006.01)

(52) U.S. Cl. .................. 709/206; 709/232; 709/217

(58) Field of Classification Search .......... 709/206, 709/203, 217–228, 232
See application file for complete search history.

(56) References Cited

U.S. PATENT DOCUMENTS

| 7,213,076 B2 * | 5/2007 | Bodin et al. ............. 709/232 |
| 7,216,159 B2 | 5/2007 | Hirose et al. |
| 7,512,661 B1 * | 3/2009 | Phillips .................. 709/206 |
| 2004/0068518 A1 | 4/2004 | McDowell |
| 2007/0105531 A1 | 5/2007 | Schroeder, Jr. |
| 2007/0130465 A1 | 6/2007 | Zeng et al. |
| 2007/0180033 A1 | 8/2007 | Singh et al. |
| 2007/0260693 A1 * | 11/2007 | Cardone et al. ............ 709/206 |
| 2008/0040237 A1 * | 2/2008 | Crussol et al. ............. 705/26 |
| 2008/0172468 A1 * | 7/2008 | Almeida ................ 709/206 |
| 2008/0235330 A1 * | 9/2008 | Cardone et al. ............ 709/203 |

* cited by examiner

Primary Examiner — Haresh N Patel
(74) Attorney, Agent, or Firm — David A. Mims; Darcell Walker

(57) ABSTRACT

A method and system creates virtual email identifications and dynamically map the virtual email-ids to the real email identities. A virtual email identify will be described in a specific fixed syntax that is easy for the users to remember and implement. The virtual email-id is dynamically mapped to one or more real email-ids by using a database of employees or other personnel maintained by the organization. The database can have various configurations that will be a function of the organization of the entity and the relationships of the persons in the entity.

18 Claims, 4 Drawing Sheets

A13@in.abc.com

FIG. 2

(A13@in.abc.com)

FIG. 3

((A13@in.abc.com))

FIG. 4

(...(A13@in.abc.com)...)

FIG. 5

[A13@in.abc.com]

FIG. 6

METHOD FOR VIRTUAL ELECTRONIC MAIL ADDRESS GENERATION AND USAGE

FIELD OF THE INVENTION

The present invention relates to a method for sending electronic mail messages to various user destinations and particular to a method for sending electronic mail messages by creating virtual email identities and dynamically mapping the virtual email identities to actual email destinations.

BACKGROUND OF THE INVENTION

In today's business environment electronic mail (email) systems are being intensively used as the official communication tool. Emails are used to communicate with friends, relatives, colleagues and also officially being used to communicate with customers. Electronic mail (email) communications are an integral part of any business and widely used outside of business as well. Although several new technologies currently compete, as the most ubiquitous tool in business communications, email remains one of the single most used communications tools for both the business and the personal user. Widespread availability, ease of use, and functionality are key components which hold email in front of developing communications methods; however, as new technologies compete for the top spot email applications must continue to build upon the strong foundation currently in place to maintain their edge as the tool of choice. By any current standard, email applications would have to be rated as mature technology; however, if improvements in email applications cease to move forward, and other tools continue to improve, loss of market share will undoubtedly result.

One of the challenges that face many entities with regard to the use of email as a means for communicating information is that when sending a message to multiple destinations, the email sender may not know the email addresses of all recipients to whom the message is desired to be sent. In one scenario, Employee A wants to send a mail message to Employee B and B's Manager (for example: 'cc' to manager). This is a very common scenario that we face in day-to-day activities. In usual situations. Employee A will know the email-id of B. But Employee A will not always know the email-id of B's Manager. A has to follow the following steps:

1. Fire a query in Bluepages for B.
2. From the result, get the email-id of B's Manager and use it.

This is no doubt about overhead for Employee A. If Employee A also has to send a mail message to B's Second line Manager (or Manager of B's manager) . . . again Employee A has to follow the above steps that will increase the overhead.

A second challenging scenario is when Employee A wants to send a mail message to all of his colleagues (or to all employees who report to A's Manager). This is also a very common scenario that we face in day-to-day activities. For example: Employee. A wants to send a New Year wishes mail message to all the team members . . . ). In one usual situation, employee A will maintain a local email group that contains all his colleagues' email-ids. But the following problem exists:

A has to maintain this email-group when an employee leaves the team—remove his email-id from the group when a new employee joins the team—add his email-id to the group If the number of email-group increases, it will be difficult for the users to remember the group names. The Team will maintain a centralized email-group that can be accessed by all the team members. But again, the following problem exists:

Some one in the team should maintain the email-group

If the number in the email-group increases, it will become difficult for the users to remember tire group names. Assuming that there is one email group for each team—you will have to remember at least 500 names w.r.t IBM . . . ). Employee A has to do the following steps:

Fire a query in Bluepages for himself

From the result, go to "people under the same manager"—get the email-ids of all the employees and user it. This is no doubt an overhead for Employee A.

There remains a need for a method and system that can address email transmissions to multiple recipients from one email message sender, when the email message sender cannot identity each address of a potential email recipient.

SUMMARY OF THE INVENTION

This invention proposes a method and apparatus to create virtual email identifications and dynamically map the virtual email-ids to the real email identities. A virtual email-id will be in a specific fixed syntax, which is easy for the users to remember. So users can create virtual email-ids easily. The virtual email-id can be mapped to one or more real email-ids dynamically by using a database of employees or other personnel maintained by the organization. The database can have various configurations that will depend on the organization of the entity and the relationships of the persons in the entity. The present invention uses a unique system of syntax to designate a virtual electronic mail address. This syntax of the virtual address is deciphered to produce an actual email location of an email recipient. The virtual email-id itself can contain a single (only one) real email-id. The virtual email-id can be used in "to", "cc" and "bcc".

In the method of the present invention, there is a determination of the organizational relationship between email users that can send and receive electronic messages. Following the determination of the relationships between the users, the next step is to define a syntax language for based on the organizational relationships between the users. This syntax language will be used to create virtual email addresses. With this syntax language when a user desires to transmit an electronic message to multiple recipients, the user can create virtual email addresses for recipients using this syntax language. Once a message has been transmitted, there is first a determination of whether the message contains a virtual address. When the electronic message does contain a virtual address, there is a determination from the syntax of the email address of the actual addresses of the recipients of the message. When the actual addresses of the message recipients is determined, the message is then sent to the determined address destinations.

DESCRIPTION OF THE DRAWINGS

FIG. 2 is a conventional email address identifying a real email destination.

FIG. 3 is a virtual email address for a recipient and the recipient's manager.

FIG. 4 is a virtual email address for a recipient and the recipient's manager and the recipient's second line manager.

FIG. 5 is a virtual email address for a recipient and the recipient's manager, the recipient's second line manager and top-level management in the organization.

FIG. 6 is a virtual email address when the recipients are all of the sender's colleagues.

DETAILED DESCRIPTION OF THE INVENTION

Figure 1:
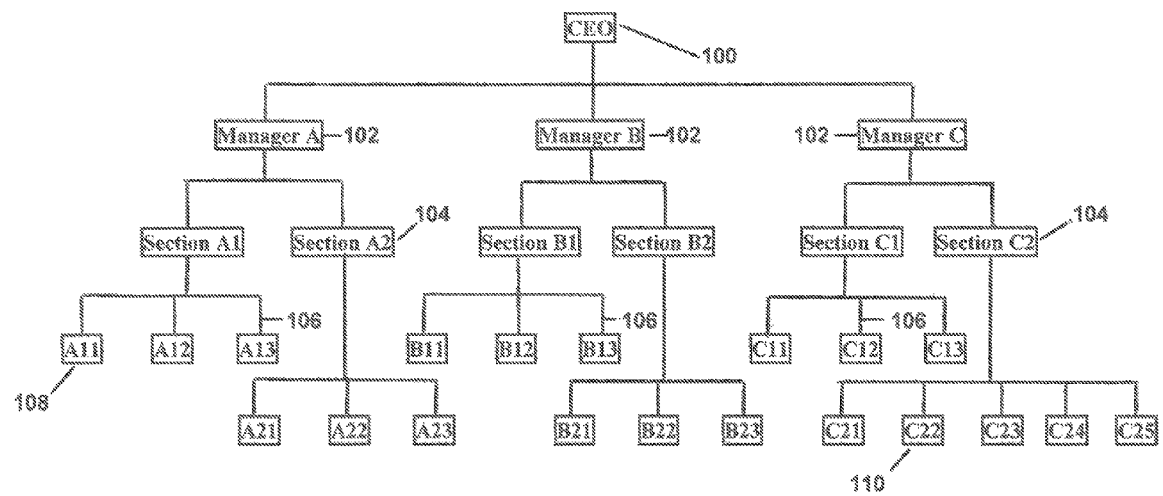
FIG. 1 is a configuration of an organization from which a virtual electronic mail syntax can be created.

The method of the present invention requires the creation of syntax to be used to generate virtual email addresses for email recipients. The creation of the syntax is related to a database of potential email recipients. The database of potential users can be organized in a manner as illustrated in FIG. 1. In this organization, there are various levels including a 'CEO' level 100, manager level 102, section level 104 and employee level 106. In the database, each entry regardless of level is a unique identifier. For example, employee 108 is identified as 'A11'. This identification designates an organizational position as employee 1 under manager A and section 'A1'. Employee 110 designates an employee as 'C22' as the $22^{nd}$ employee under manager C and section C2. In this illustration, the employee level entries are identified by the number of characters (3) in their designation as well as the meaning for each character. The first character ('A') in the character string can designate a position under a particular manager. In this application it is manager 'A'. The second character designates the section under manager 'A'. This section is section "1". The third character identifies the number of the employee. This employ is numerically, the first employee in that section.

Managers and section leaders can also be designated by the information obtained from the character string. In this illustration, the identity of section leader 'A1' is only a two character string. The length of the character string can indicate an organizational level. The character 'A' indicates that the section leader is under manager 'A'. The number '1' indicates that this is the first section leader.

In addition to the actual characters that identify the position of each entry in the database, the syntax also includes symbol characters such as '(', '[' and ' . . . '. FIGS. 2, 3, 4 and 5 illustrate various virtual email addresses for use in embodiments of the present invention. Each email destination address will contain at least one real email address. This real email address not only serves as a destination address of the message but also a reference point to determine the other email destination addresses. Referring to FIG. 2, the email address is A13@in.abc.com. A user desires to send an email message to 'A13'. This email designation is only for the real address for A13. The information following the @ is merely routing information within an organization that will generally not affect the recipient designation within the organization.

FIG. 2 is an illustration of an email destination address containing real and virtual components. This email address requires the use of syntax to generation the virtual component of the address. The virtual component can be various symbols included in the email address character string. Referring to FIG. 3, in one application, in addition to the real email identify, designations for managers in the virtual email-ID syntax can be the (real email-id). This email designation contains '(' and ')' symbols. In another virtual address shown in FIG. 4, for peers and colleagues, the virtual email-id syntax will be [real email-id]. The virtual email-ID can contain '[' and ']' symbols. The following example shows the virtual address of FIG. 3. Employee A13 wants to send an email message to B11 and B11's immediate Manager (Section B1) Employee A knows the email-id of B11. The addresses for this email can be as follows:

To: B11@in.abc.com
CC: (B11@in.abc.com)

The CC is to a virtual email address for Section B1 destination. The '(' and ')' indicate that this address is virtual address. The real identify, B11, serves as the reference to location this address destination. The '(' and ')' indicate that this destination is the immediate manager of employee B11. The virtual address can be designated as primary destination location was well as the indicated copy (CC) location.

In a second example referring to FIG. 4, Employee A13 wants to send an email to C23, C23's immediate manager, and C23's second-in-line Manager (C1).

To: C23@in.abc.com
CC: (C23@in.abc.com), ((C23@in.abc.com))

In the particular syntax, '((' and '))' designate the second level manager for the primary designation. Employee C23 is the real email address, and '(' and ')' designates C23's immediate manager. Although not shown in this database configuration, for a third line manager prior to the CEO, the syntax could provide for the use of one more small bracket around the email-id, i.e. for each organization reporting level, add one small bracket around the email-id.

Referring to FIG. 5, employee A11 now wants to send an email to B11, B11's first line or immediate manager, B11's second line and up to top level CEO. Add 3 dots ( . . . ) between the first and second small baskets—this will send mail to all the managers up to the Top Level. This designation could be in the form of a character string '( . . . (' and ') . . . )'.

To: ( . . . (A11@in.abc.com) . . . ).

The character string ( . . . ( indicates managers ail the way to the top of the organization chart. The prior examples we have shown in "CC" . . . user can also use Virtual E-mail ID's in "TO", "BCC" also.

Referring to FIG. 6, Employee A11 wants to send an email to ail his colleagues (or to all the employees who report to Section A1).

To: [A11@in.abc.com]
CC: (A11@in.abc.com)

In this example, the symbols '[' and ']' refer to colleagues of A11. As previously mentioned, the '(' and ')' designate the immediate manager of A11.

The various symbols and character strings form a syntax by which a user can generate a virtual electronic mail destination. However, the syntax will contain rules that will govern the order or arrangement of various characters and symbols that are included in a string of characters that, identity an email location. For example, having the character string of "(( . . . [" may not be permissible to identify an electronic mail destination. When the embodiments of the present invention read an impermissible an character string, an error message is produced and sent to the sender of the electronic mail message.

Figure 7:
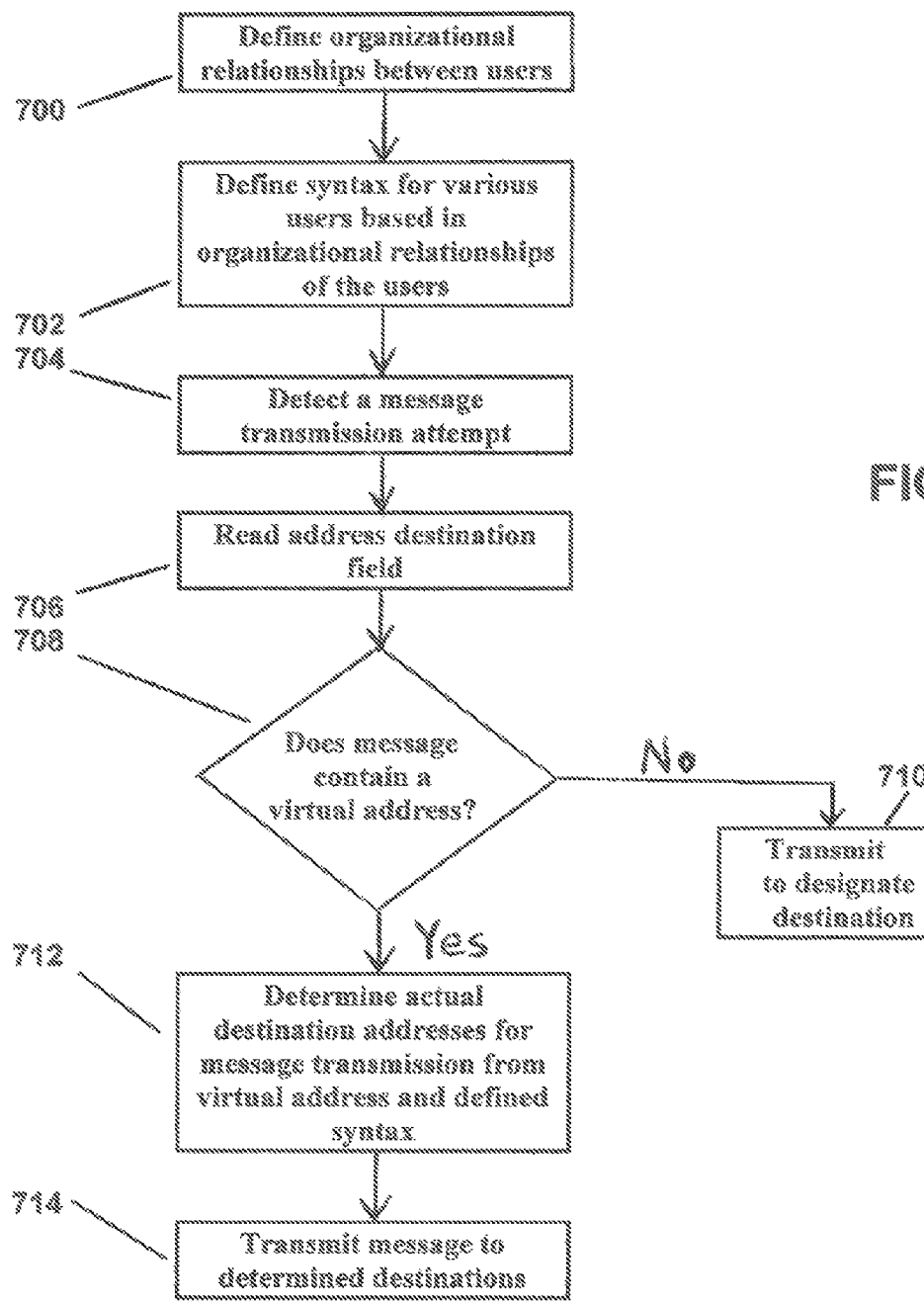
FIG. 7 is a flow diagram of the steps in the method of the present invention using virtual email addresses to designate multiple recipients in an electronic mail message.

FIG. 7 illustrates an embodiment of the method of implementing the present invention. In the embodiments of the present invention, users will generate the virtual Emails-Ids . . . which is very simple as shown above. However, these virtual email IDs must be converted to actual email destinations.

The initial step 700 in an embodiment of the method of the present invention is to define the organizational relationships between users that are capable of sending and receiving electronic mail in a network. As mentioned, this relationship defining step is accomplished in the development of an organizational database as shown in FIG. 1. An additional part of this relationship defining step is to designate specific locations for database entries. As mentioned, the designation (A11) refers to an employee in section A1 under manager A.

These relationships between entries can be implemented in a series of pointers between database entries. Once the relationships between users have been defined, step 702 defines the syntax to be used to generate virtual email destinations. This syntax is a set of rules that describe the arrangement of character strings to indicate and designate virtual email addresses that will be used to identify actual email destinations. The particular rules and arrangements of character strings can be at the discretion of the system designer or can be based some particular desired configuration.

Steps 700 and 702 comprise the initial steps in setting up of the system. The remainder of the steps relate to transmission of email messages. A user desiring to send an email message to a virtual address can formulate the message and destination address. The destination including real and virtual addresses can be entered in the TO: field of an email message. The user can user the virtual email destination syntax to designate a virtual email address. Once the user has transmitted the message, step 704 detects the message transmission attempt. This message transmission is intercepted and step 706 reads the destination address in the TO: field. Step 708 determines whether the destination address contains a virtual destination. This determination is done by reading the characters (symbols) in the destination address as previously discussed. If the determination is that the destination email only contains real email addresses and no virtual addresses, the method moves to step 710 which transmits the message as is without the need to identify any real email address destinations. If the determination in step 708 is that the destination email address does contain at least one virtual address, the method moves to step 712 where the actual email addresses are determined from the syntax of the characters of the email addresses. This determination of actual email addresses can require mapping of the address locations based on a reference address location. This reference address location can be a real address where the message is also to be transmitted. When the actual addresses are determined from the virtual address, step 714 transmits the message to the destination location.

Figure 8:
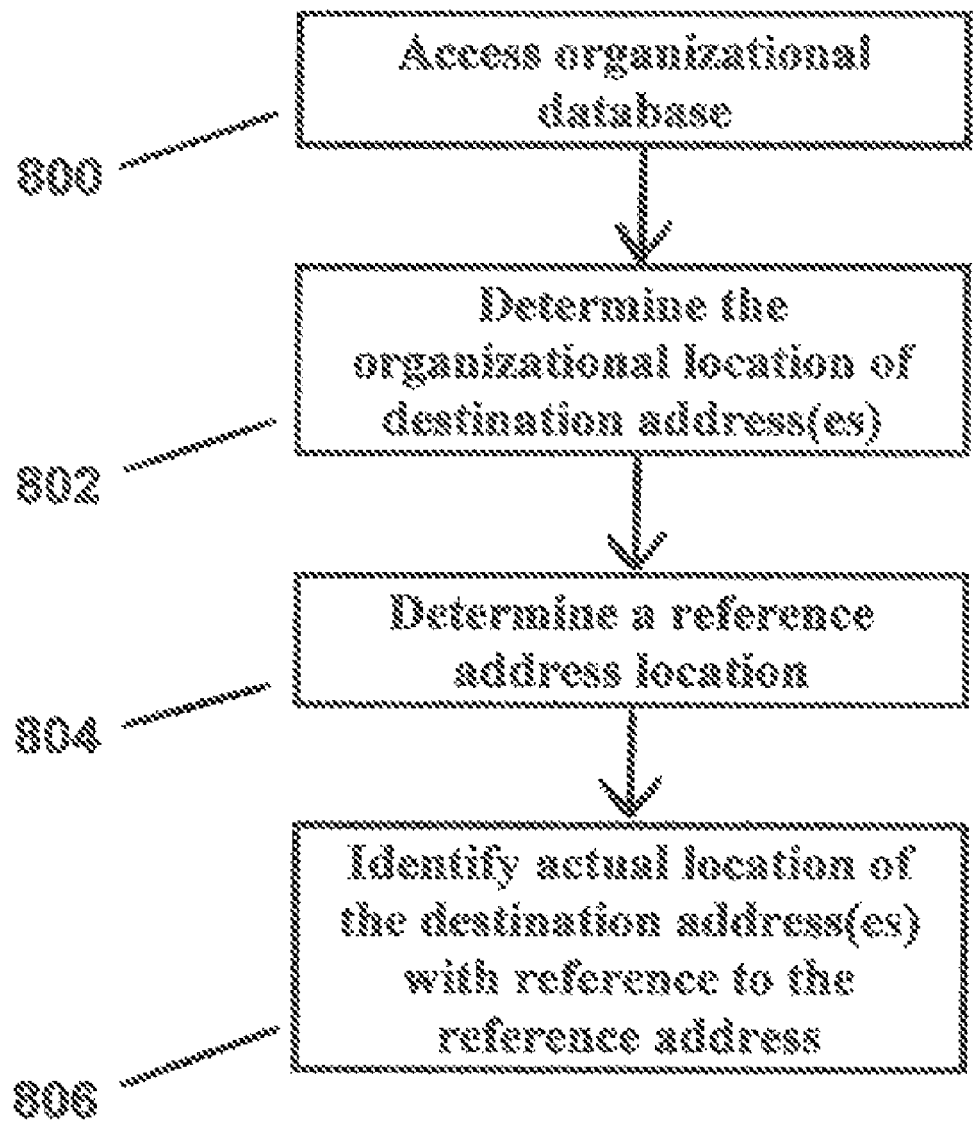
FIG. 8 is a detailed flow diagram of the activities in the step of determining the actual destination addresses for a message transmission from a virtual address.

FIG. 8 is a detailed flow diagram of the activities in the step of determining the actual destination addresses for a message transmission from a virtual address. This flow diagram is of step 712. In this method of step 712, step 800 accesses the organizational database described in FIG. 1. Once the database is accessed, step 802 determines the organization location of the destination address or addresses. These destination addresses are determined based on characters in the email address character string. As previously discussed, various symbols such as '(' and '[' are used to identify various organizational destination locations. Step 804 generates a reference address location to determine the destination locations. The reference location can be viewed as a starting point in the database to get to the desired destination locations. Once the destination location has been identified, step 806 identifies the actual email destination for the identified destination locations.

It is important to note that while the present invention has been described in the context of a fully functioning data processing and television programming system, those skilled in the art will appreciate that the processes of the present invention are capable of being distributed in the form of instructions in a computer readable storage medium and a variety of other forms, regardless of the particular type of medium used to carry out the distribution. Examples of computer readable media include media such as EPROM, ROM, tape floppy disc, hard disk drive, RAM, and CD-ROMs.

We claim:

1. A method for generating a virtual electronic mail address comprising the steps:
    generating a database that defines organizational relationships between entities in the database;
    creating a syntax to define virtual email destination locations, the syntax being related to the organizational relationships between entities in the database;
    generating one or more electronic mail destination locations to send an electronic message, at least one of the destination locations being a virtual email location, the virtual email address being generated using the created syntax;
    generating an electronic mail message to be sent to the generated one or more electronic mail destination locations;
    detecting and intercepting an attempt to transmit an electronic mail message;
    identifying the generated one or more electronic mail destination locations;
    determining whether any of the one or more electronic mail destination locations is a virtual electronic mail destination location;
    when the determination is that at least one of the electronic mail destination locations is a virtual electronic mail destination location, determining an actual electronic mail destination corresponding to the virtual electronic mail destination location and based on the syntax of the virtual electronic mail destination location; and
    transmitting the generated electronic mail message to the identified actual electronic mail destination locations, said actual locations are identified in the electronic mail message or determined from a virtual email destination location described by the created syntax.

2. The method as described in claim 1 wherein the generated syntax comprises a string of alphabet character and alphanumeric characters and symbols.

3. The method as described in claim 2 wherein said determining whether any of the one or more electronic mail destination locations is a virtual electronic mail destination location step further comprising:
    reading a first character in an electronic mail destination address in the generated electronic mail message; and
    determining whether there can be determination of an organization relationship between a reference electronic email destination location and an identified virtual electronic mail address; and
    when the determination is that there cannot be determination of an organization relationship between a reference electronic email destination location and an identified virtual electronic mail address from the first character, reading all characters in the string before the reference email destination location.

4. The method as described in claim 2 wherein said determining whether any of the one or more electronic mail destination locations is a virtual electronic mail destination location step further comprising:
    reading a first character in an electronic mail destination address in the generated electronic mail message; and
    determining whether there can be determination of an organization relationship between a reference electronic email destination location and an identified virtual electronic mail address.

5. The method as described in claim 4 wherein said character reading step further comprises reading a string of one or more initial characters in the in the email message and determining whether the read character string is a value syntax email entry.

6. The method as described in claim 1 wherein said step of determining an actual electronic mail destination corresponding to the virtual electronic mail destination location and based on the syntax of the virtual electronic mail destination location further comprises:
    determining a reference email destination location;
    determining an organization location in the database of a destination location in the virtual electronic mail address; and
    identifying actual location of the destination address(es) with reference to the reference address.

7. The method as described in claim 1 wherein said step of determining an actual electronic mail destination corresponding to the virtual electronic mail destination location and based on the syntax of the virtual electronic mail destination location further comprises:
    determining a reference email destination location;
    determining an organization location in the database of a destination location defined in the virtual electronic mail address; and
    mapping the determined organization location in the database to an actual electronic mail destination location.

8. The method as described in claim 7 wherein the reference email destination location is a real email address of a recipient.

9. The method as described in claim 7 wherein the reference email destination location is a virtual email address of a recipient, the virtual email address corresponding the an organizational location in the database.

10. The method as described in claim 1 wherein said syntax creating step further comprises creating a set of syntax rules that will the sequential arrangement of character in a character string of an email address.

11. A computer program product stored in a non-transitory computer readable storage medium for generating a virtual electronic mail address comprising:
    instructions generating a database that defines organizational relationships between entities in the database;
    instructions creating a syntax to define virtual email destination locations, the syntax being related to the organizational relationships between entities in the database;
    instructions generating one or more electronic mail destination locations to send an electronic message, at least one of the destination locations being a virtual email location, the virtual email address being generated using the created syntax;
    instructions generating an electronic mail message to be sent to the generated one or more electronic mail destination locations;
    instructions detecting and intercepting an attempt to transmit an electronic mail message;
    instructions identifying the generated one or more electronic mail destination locations;
    instructions determining whether any of the one or more electronic mail destination locations is a virtual electronic mail destination location;
    when the determination is that at least one of the electronic mail destination locations is a virtual electronic mail destination location, instructions determining an actual electronic mail destination corresponding to the virtual electronic mail destination location and based on the syntax of the virtual electronic mail destination location; and
    instructions transmitting the generated electronic mail message to the identified actual electronic mail destination locations, said actual locations are identified in the electronic mail message or determined from a virtual email destination location described by the created syntax.

12. The computer program product as described in claim 11 wherein the generated syntax comprises a string of alphabet character and alphanumeric characters and symbols.

13. The computer program product as described in claim 12 wherein said instructions determining whether any of the one or more electronic mail destination locations is a virtual electronic mail destination location step further comprise:
    instructions reading a first character in an electronic mail destination address in the generated electronic mail message; and
    instructions determining whether there can be determination of an organization relationship between a reference electronic email destination location and an identified virtual electronic mail address; and
    when the determination is that there cannot be determination of an organization relationship between a reference electronic email destination location and an identified virtual electronic mail address from the first character, instructions reading all characters in the string before the reference email destination location.

14. The computer program product as described in claim 12 wherein said instructions determining whether any of the one or more electronic mail destination locations is a virtual electronic mail destination location instructions further comprise:
    instructions reading a first character in an electronic mail destination address in the generated electronic mail message; and
    instructions determining whether there can be determination of an organization relationship between a reference electronic email destination location and an identified virtual electronic mail address.

15. The computer program product as described in claim 14 wherein said character reading instructions further comprise instructions reading a string of one or more initial characters in the in the email message and determining whether the read character string is a value syntax email entry.

16. The computer program product as described in claim 11 wherein said instructions determining an actual electronic mail destination corresponding to the virtual electronic mail destination location and based on the syntax of the virtual electronic mail destination location further comprise:
    instructions determining a reference email destination location; instructions determining an organization location in the database of a destination location in the virtual electronic mail address; and
    instructions identifying actual location of the destination address(es) with reference to the reference address.

17. The computer program product as described in claim 11 wherein said instructions determining an actual electronic mail destination corresponding to the virtual electronic mail destination location and based on the syntax of the virtual electronic mail destination location further comprise:
    instructions determining a reference email destination location;
    instructions determining an organization location in the database of a destination location defined in the virtual electronic mail address; and
    instructions mapping the determined organization location in the database to an actual electronic mail destination location.

18. The computer program product as described in claim 11 wherein said syntax creating instructions further comprise instructions creating a set of syntax rules that will the sequential arrangement of character in a character string of an email address.

* * * * *